Figure 1:
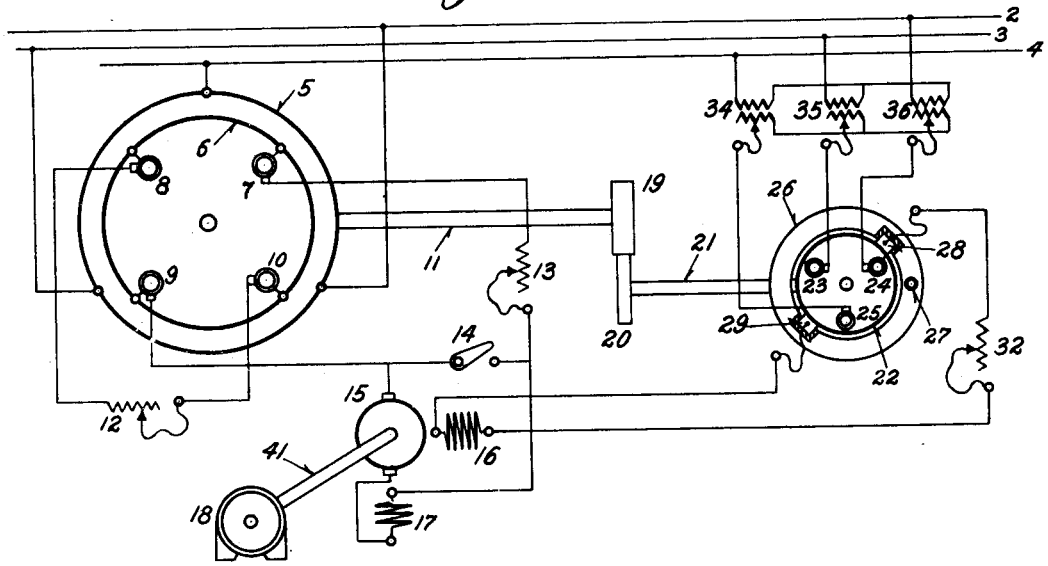

March 12, 1929.  V. A. FYNN  1,704,828
SYNCHRONOUS MOTOR
Filed June 12, 1926

Inventor:
VALÈRE ALFRED FYNN,
By John H. Bruninga
His Attorney

Patented Mar. 12, 1929.

1,704,828

UNITED STATES PATENT OFFICE.

VALÈRE A. FYNN, OF ST. LOUIS, MISSOURI.

SYNCHRONOUS MOTOR.

Application filed June 12, 1926. Serial No. 115,421.

My invention relates to separately excited synchronous motors with or without the constructive elements of non-synchronous motors, and has particular reference to the synchronizing of such motors.

The unidirectional magnetization on the secondary of this type of machine is usually derived from a direct current generator, mostly referred to as the exciter, which is either driven from the synchronous motor itself or from some other motive source. While, for many purposes, such a combination operates well enough at synchronism, particularly when some of the many known inherent or external compounding arrangements are used, yet, the unidirectional voltage supplied by this type of auxiliary generator produces an alternating synchronizing torque having equal positive and negative maxima which is liable to cause hunting during the synchronizing period and which greatly reduces the asynchronous overload capacity of the motor in which it is produced.

One of the objects of this invention is to make use of an auxiliary generator capable of generating direct current but to so modify it as to cause it to deliver a voltage which is always of the slip frequency of the main motor and which is, therefore, unidirectional when said motor runs synchronously and alternating at other motor speeds. Having provided such an auxiliary generator, a further object is to adjust the phase of the auxiliary slip frequency voltage it supplies so as to produce a strictly or a substantially unidirectional synchronizing torque. To this end I laminate the whole magnetic circuit of the so called exciter and preferably neutralize its armature reaction. Furthermore I provide this generator with separate excitation, exciting it by means of a voltage of slip frequency, of an amplitude independent of its frequency and which becomes unidirectional at synchronism. I prefer to adjust the phase of the voltage and therefore of the current delivered by the auxiliary generator by adjusting the phase of its exciting voltage or current.

Another object of this invention is to make use of the improved form of auxiliary generator to provide a plurality of phase displaced, strictly or substantially unidirectional synchronizing torques, thus producing either a constant synchronizing or a continuous synchronizing torque the magnitude of which varies but does not fall to zero and does not reverse.

A further object is to so adjust the phase of the auxiliary voltage or voltages as to secure not only a synchronizing torque of improved configuration but also an acceptable compounding characteristic.

The objects and features of this invention will appear from the detail description taken in connection with the accompanying drawings and the nature of the invention will be pointed out in the claims.

Figure 2:
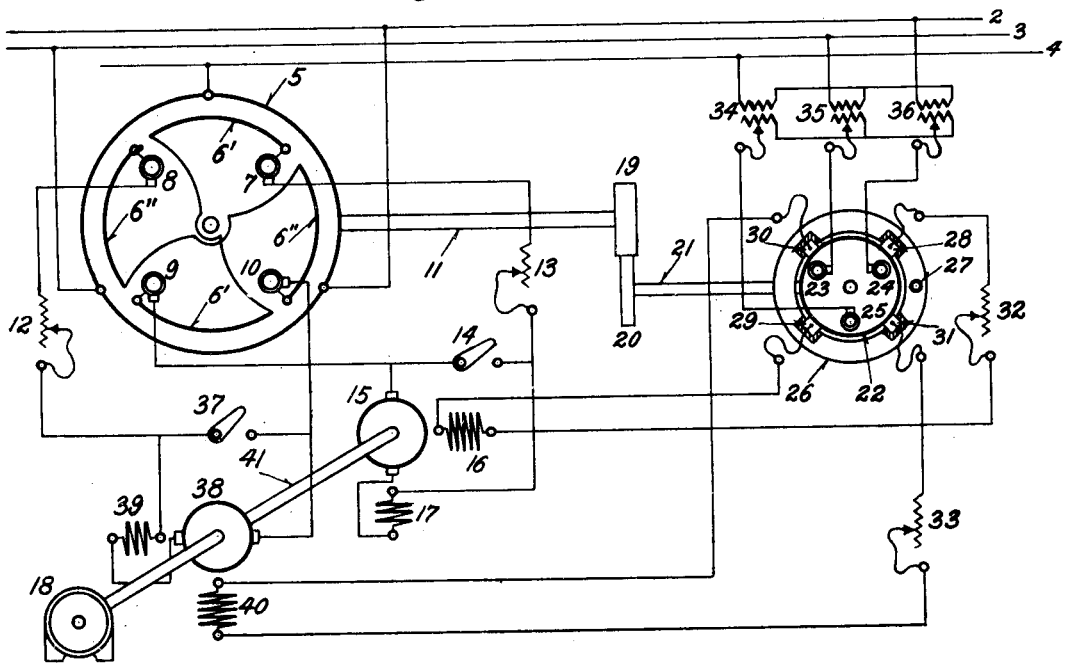

In the accompanying diagrammatic drawings of two pole machines, Figs. 1 and 2 show two embodiments of my invention as applied to three phase synchronous motors with stationary primaries.

Referring to Fig. 1, the primary of the motor carries a three-phase winding 5 connected to the supply 2, 3, 4 in some suitable manner, the secondary is provided with a winding 6 closed along two axes per pole pair and used as a two phase winding. To this end sliprings 7, 8, 9, 10 are connected to the winding at intervals of 90 electrical degrees. The sliprings 8, 10 permit of one phase on the secondary being closed over the adjustable resistance 12. The sliprings 7, 9 permit of the other phase on the secondary to be connected to the auxiliary generator circuit comprising the armature 15 with its cooperating brushes and the neutralizing winding 17. The secondary circuit determined by the sliprings 7, 9 also contains the adjustable resistance 13. Switch 14 permits of the auxiliary generator circuit 15, 17 being short circuited. The auxiliary generator is driven in some convenient manner for instance by means of some motor 18, the speed at which it is driven is immaterial, for the arrangements shown in Figs. 1 and 2 this speed should preferably be constant. The synchronous motor 5, 6 drives the frequency converter 22, 26 through the motor shaft 11, the gear wheels 19, 20 and the converter shaft 21. The revolving member of the converter carries a commuted winding 22 connected to the supply 2, 3, 4 through the sliprings 23, 24, 25 and cooperating brushes, and through the adjustable ratio transformers 34, 35, 36. Brushes 28, 29 cooperate with the commuted winding 22 and are insulatingly carried on a suitable brush-rocker arm or on the stationary and laminated member 26 of the converter. The rocker arm or the stationary member can be moved about the shaft 21 by means of the handle 27 thus making it possible to circumferentially adjust the position of the brushes 28, 29. These brushes are connected to the exciting winding 16 of the auxiliary generator through the adjustable resistance 32. Because the motor as well as the exciter are supposed to be two pole machines the gear wheels 19 and 20 are of same pitch diameter. When the number of poles of these two machines differs, as will usually be the case, the ratio of the gear wheels should be changed accordingly to cause 22 to run synchronously when 6 runs synchronously. In the case of commuted windings the brushes cooperating with same are shown as resting directly on the commuted winding, in practice commutators would be interposed.

Fig. 2 differs from Fig. 1 in that the secondary of the motor carries a two phase winding with independent phases 6' and 6", also in that the phase 6" made accessible by the sliprings 8, 10 is closed through a second auxiliary generator circuit 38, 39 which can, however, be short circuited by the switch 37. A further difference is that two sets of brushes 28, 29 and 30, 31 cooperate with the commuted winding 22 of the frequency converter. The second set of brushes 30, 31 is connected to the exciting winding 40 of the second auxiliary generator circuit through the adjustable resistance 33. In this example the brush sets on the converter are displaced by 90 electrical degrees and so are the axes of the windings 6', 6" to which they are connected. This conformity of displacement is not necessary.

Turning to the mode of operation of Fig. 1, the connections between the sliprings of the frequency converter and the transformers 34, 35, 36 are so made that the primary flux produced by 22 revolves in a direction opposed to that in which 22 is driven by the motor 5, 6. This being done the speed of the primary flux in the exciter 22, 26 with reference to the stationary brushes 28, 29 will be synchronous when the motor 5, 6 stands still and zero when said motor runs synchronously, this for the reason that in so far as 22 is concerned the speed of said primary flux must always be synchronous. The brush voltage of the exciter will therefore always be of the frequency of the slip of the synchronous motor and of an amplitude independent of the speed of said motor because this amplitude depends on nothing but the magnitude of the primary flux in the exciter and on its speed relatively to 22, which speed is constant. The synchronous motor runs asynchronously while accelerating or decelerating, during which periods it has a "slip". Some synchronous motors can carry overloads asynchronously, when they also "slip".

By making the magnetic system of the auxiliary generator 15 laminated throughout, driving it at any desired speed and connecting its exciting winding 16 to the brushes 28, 29 of the frequency converter, the voltage delivered by said auxiliary generator will also always be of the frequency of the slip of the synchronous motor regardless of the speed at which said generator is driven.

When starting the motor 5, 6 the exciting circuit of the auxiliary generator may be interrupted at 32, the auxiliary generator circuit 15, 17 short circuited at 14, and the motor started like an ordinary slipring induction motor with the help of the resistances 12, 13. When its highest induction motor speed is reached, or at some earlier stage, the switch 14 is opened and the circuit of the exciting winding 16 closed at 32. The auxiliary generator circuit 15, 17 now delivers a voltage of same frequency as that generated in 6 by the primary flux produced by the winding 5 of the motor. This primary flux revolves synchronously with respect to 5. To secure a strictly unidirectional synchronizing torque it is necessary to so adjust the phase of the slip-frequency voltage delivered by the auxiliary generator circuit 15, 17 that, near synchronism, it shall be practically cophasal and codirectional with the voltage concurrently generated by the primary motor flux in 6, as it appears at the sliprings 7, 9. To secure a substantially unidirectional synchronizing torque this phase coincidence may be departed from to some extent in which case the synchronizing torque becomes alternating with unequal positive and negative maxima. If a phase difference of about 45 degrees is allowed this torque will show negative maxima which amount to about 18 per cent of the positive maxima, the latter lasting about three times as long as the former. A torque of such configuration is still considered to be substantially unidirectional.

After the motor 5, 6 has been brought up to synchronism by a strictly or a substantially unidirectional torque it locks in synchronism and carries variable load at synchronous speed. Under synchronous operating conditions the voltage at the brushes 28, 29 is unidirectional and, as is now well known, it varies with varying load on the motor 5, 6. This voltage varies because any change in load brings about a momentary acceleration or deceleration of the revolving member of the motor and also of the revolving member of the exciter which is coupled to it, resulting in a change of the axis of the primary flux in the motor with respect to the axis of the unidirectional magnetization on the secondary thereof, and in a corresponding change of the axis of the primary flux in the exciter with respect to the brush axis thereof. This last change causes the voltage at the brushes 28, 29 to vary. In order to secure a compounding effect in the motor 5, 6 the voltage at the brushes 28, 29 must be caused to increase with increasing motor load. To this end said brushes must be so set with respect to the position occupied by the axis of the exciter primary flux at no-load, and at synchronism of the main motor, that an increase in motor load shall bring the axis of the primary flux of the exciter closer to the perpendicular to the axis of the brushes 28, 29.

I have found that in order to secure a substantially unidirectional synchronizing torque and a very useful compounding characteristic without the necessity of changing the adjustment of the phase of the auxiliary voltage when passing from the synchronizing period to that of synchronous operation, it is necessary to so adjust the phase of the auxiliary voltage supplied by 15 near synchronism, that it shall lead the voltage concurrently generated in 6 and appearing at 7, 9 by some 20 degrees, generally useful values usually lie around 10 to 30 degrees.

Expressed in other terms, a strictly unidirectional synchronizing torque is secured when the phase of the auxiliary voltage impressed on the sliprings 7, 9 is such as to produce, near synchronism, conduced alternating current ampereturns in 6 which reach a maximum at a time when the axis, here 7, 9, of said ampereturns is displaced by 90 electrical degrees from the axis of the primary flux set up by the primary 5 of the motor. A substantially unidirectional synchronizing torque is had when the conduced ampereturns in 6 reach a maximum value at a time when the axis of the primary flux is somewhat displaced from the perpendicular to the axis of the conduced ampereturns. This displacement may amount to about 45 electrical degrees when it can be spoken of as a material displacement. Finally a substantially unidirectional synchronizing torque and a useful compounding characteristic are had when the conduced ampereturns in 6 reach a maximum at a time when the axis of the primary motor flux has passed the axis of said ampereturns and progressed some 70 degrees beyond it. Generally useful values usually lie around 60 and 80 degrees.

One way of adjusting the phase of the auxiliary voltage supplied by the auxiliary generator circuit 15, 17 consists in suitably displacing the brushes 28, 29 whereby the phase of the exciting current in 16 is changed.

The motor of Fig. 1 can also be started without closing switch 14 in which case the armature and the brushes of the auxiliary generator must carry the secondary starting current of the motor 5, 6. This current is of line frequency and is liable to cause sparking at the brushes of the generator. Under these circumstances it is of particular importance to provide said generator with the neutralizing winding 17.

In operating the motor of Fig. 2 switches 14 and 37 may be closed and the circuits of the exciting windings 16 and 40 interrupted at 32 and 33 at starting, the machine being run up to nearly synchronous speed with the help of the resistances 12, 13 and just like an ordinary polyphase slipring induction motor. As an alternative the switches 14 and 37 may be left open. When a sufficiently high speed has been secured and switches 14, 37 are open, the exciting windings 16 and 40 are energized and the phases of the auxiliary voltages delivered by the auxiliary generating circuits 15, 17 and 38, 39 adjusted as previously explained. If this adjustment is carried out by displacing the member 26 of the frequency converter, then two strictly or substantially unidirectional synchronizing torques are produced by the secondary windings 6' and 6''. In Fig. 2 these torques are displaced in space or in phase to the extent to which the secondary windings 6' and 6'' are displaced.

If two single-phase synchronizing torques are produced which have the same configuration and amplitude and if the secondary motor windings 6' and 6'' producing them are displaced by 90 electrical degrees, then the resultant synchronizing torque is constant. The same is true of three single-phase synchronizing torques of equal configuration and amplitude produced by three windings on the secondary displaced by 120 or by 60 electrical degrees and so on.

If, when producing a plurality of single phase synchronizing torques, the configurations of the component torques are not the same, or their amplitudes are different, or the spacing of the secondary windings does not correspond to the number of synchronizing torques produced then the resultant synchronizing torque is continuous but not constant.

The configuration of the component torques can, for instance, be changed by changing in a secondary circuit the phase relation between the generated and the auxiliary voltage in that circuit with respect to the phase relation between the generated and the auxiliary voltage in another secondary circuit. This can be done in Fig. 2 for instance by spacing the brush sets 28, 29 and 30, 31 by some angle other than 90. The amplitude of any component torque can be changed by any means which will change the number of ampereturns in the secondary circuit producing said torque. This can be done in Fig. 2 for instance by impressing on the sliprings 23, 24, 25 voltages of unequal magnitude or by manipulating the resistances 32 or 33. The resultant torque will be continuous but not constant if auxiliary voltages displaced in phase by ninety degrees are for instance impressed on secondaries displaced by more or by less than 90 electrical degrees and so on.

If a constant torque is used for bringing the motor up to synchronism, the machine will not operate synchronously unless some change is made which at speeds other than the synchronous would result in a continuous but not constant polyphase or in a single-phase torque. Thus if the motor of Fig. 2 is brought up to synchronism with a constant polyphase torque it can be forced to operate synchronously over a range of loads by interrupting the circuit of 40 at 33, when switch 37 can be closed. This results in a change from a polyphase to a single phase synchronizing torque. Synchronous operation under varying loads can also be secured by causing the ampereturns in 6′ to differ from those in 6″, for instance by changing the exciting current in 16 cooperating with one generator circuit with respect to the exciting current in 40 cooperating with the other generator circuit, or by unbalancing as to magnitude the voltages impressed on the sliprings 23, 24, 25.

It will be understood that the number of phases on the secondary of the motor can be chosen without reference to the number of phases on its primary. The two auxiliary generator circuits 15, 17 and 38, 39 of Fig. 2 can, of course be combined in a single machine using a single commuted winding with two sets of brushes cooperating with same and displaced by 90 electrical degrees, as shown. The neutralizing windings 17, 39 and the exciting windings 16, 40 would retain the space relation shown and there would be no interference as between the two auxiliary voltages provided the neutralizing windings are used.

While theories have been advanced as to operation of the machines and methods here described, this has been done with a view to facilitating the description thereof and it is to be understood that I do not bind myself to these or any other theories.

It will be clear that various changes may be made in the details of this disclosure without departing from the spirit of this invention, and it is, therefore, to be understood that this invention is not to be limited to the specific details here shown and described.

What I claim is:

1. An alternate current motor having a primary and a secondary, a polyphase winding on the primary, a winding on the secondary in inductive relation to the primary, an auxiliary machine having a laminated magnetic circuit, a generating and an exciting winding on the auxiliary, a source of voltage of the slip frequency of the motor and of an amplitude independent of this frequency, connections between the generating winding on the auxiliary and the winding on the secondary of the motor, connections between said source and the exciting winding on the auxiliary, and an ohmic resistance in circuit with said source and said exciting winding adapted to decrease the ratio of reactance to resistance in the circuit of said exciting winding.

2. An alternate current motor having a primary and a secondary, a polyphase winding on the primary, means on the secondary adapted to magnetize along displaced axes per pole pair, means for generating phase displaced voltages, exciting windings for said generating means, a source of phase displaced voltages of the slip frequency of the motor and of an amplitude independent of this frequency, connections between said generating means and the magnetizing means on the secondary, connections between said source and said exciting windings, and an ohmic resistance in circuit with each of said exciting windings adapted to decrease the ratio of reactance to resistance in each exciting circuit.

In testimony whereof I affix my signature this 26th day of May, 1926.

VALÈRE A. FYNN,